United States Patent

Duncan

[15] 3,705,574
[45] Dec. 12, 1972

[54] WATER HEATING AND STORAGE SYSTEM WITH MIXING VALVE

[72] Inventor: Angelo N. Duncan, Bourbonnais, Ill.

[73] Assignee: A. O. Smith Corporation, Milwaukee, Wis.

[22] Filed: July 9, 1971

[21] Appl. No.: 161,084

[52] U.S. Cl. ................................. 126/362, 237/8 C
[51] Int. Cl. ............................................. F24d 3/02
[58] Field of Search ......... 126/362; 237/8 R, 8 C, 19, 237/63

[56] References Cited

UNITED STATES PATENTS

| | | | |
|---|---|---|---|
| 2,245,967 | 6/1941 | Dillon | 126/362 |
| 3,397,841 | 8/1968 | Kieslich | 237/8 |
| 3,413,969 | 12/1968 | Whittell, Jr. | 126/362 |

*Primary Examiner*—Charles J. Myhre
*Attorney*—Andrus, Sceales, Starke & Sawall

[57] ABSTRACT

The invention relates to a water heating system in which a single water heater is utilized in combination with a storage tank and pump to provide hot water for various uses. The invention is particularly directed to the use of a thermostatic mixing valve set at a predetermined temperature and located at a juncture between a recirculating conduit from the water heater and the conduit for the flow of water from the storage tank or a source of fresh water supply to the water heater so that water which has already been heated by the water heater may be mixed with the colder water supplied to the water heater to be heated.

4 Claims, 3 Drawing Figures

INVENTOR.
ANGELO N. DUNCAN

WATER HEATING AND STORAGE SYSTEM WITH MIXING VALVE

BACKGROUND OF THE INVENTION

In previously known water heating systems which employ a separate heater for heating water to be stored in a storage tank at a predetermined temperature, a substantial period of time passes before the water heated by the heater reaches the desired temperature. Furthermore, if hot water is supplied from the heater to the top of the tank to reduce the time until a portion of the water is available at a desired temperature, a considerable temperature rise in the heater occurs before the desired outlet temperature is reached. Seasonal changes in supply water temperature and in the temperature of the water returned from the storage tank have resulted in the requirement of varying or unstable temperature rises in the heater to provide water at the desired usable temperature.

SUMMARY OF THE INVENTION

The invention overcomes the previously known problems by providing a construction wherein the heater operates with a small rise in temperature to furnish water at the temperature desired within a short space of time. The construction permits a stable temperature rise in the heater despite changes in temperature of the incoming supply water whether from the storage tank or other source of supply.

The results obtained are provided by a recirculating conduit connected to the outlet conduit of the heater which recirculates water from the outlet conduit heater to the inlet conduit of the heater by operation of a pump in the system through a thermostatic mixing valve. The valve mixes the colder inlet water from the inlet conduit with the recirculated hot water and the mixed water then flows into the heater. The colder water provided to the mixing valve comes either from the storage tank or a fresh water supply.

In the operation at start up of the system, the thermostat of the mixing valve is set at a predetermined temperature and normally the cold inlet side of the mixing valve will be closed and the hot inlet side will be open and the water in the system will be circulated by the pump only through a mixing loop consisting of the inlet conduit, the heater, the heater outlet, the recirculating conduit and thence through the mixing valve and inlet conduit back to the heater. When the water has recirculated through the mixing loop a few times, the temperature of the water will rise causing the thermostat to open at its predetermined temperature setting and permitting the cold water to enter the valve and mix with the hot water. When this occurs, a portion of the water from the heater will continue to recirculate through the mixing loop and a second portion will flow to the storage tank or be discharged from the system for use.

The drawings provided herewith illustrate the best mode of the invention presently contemplated by the inventor.

Figure 1:
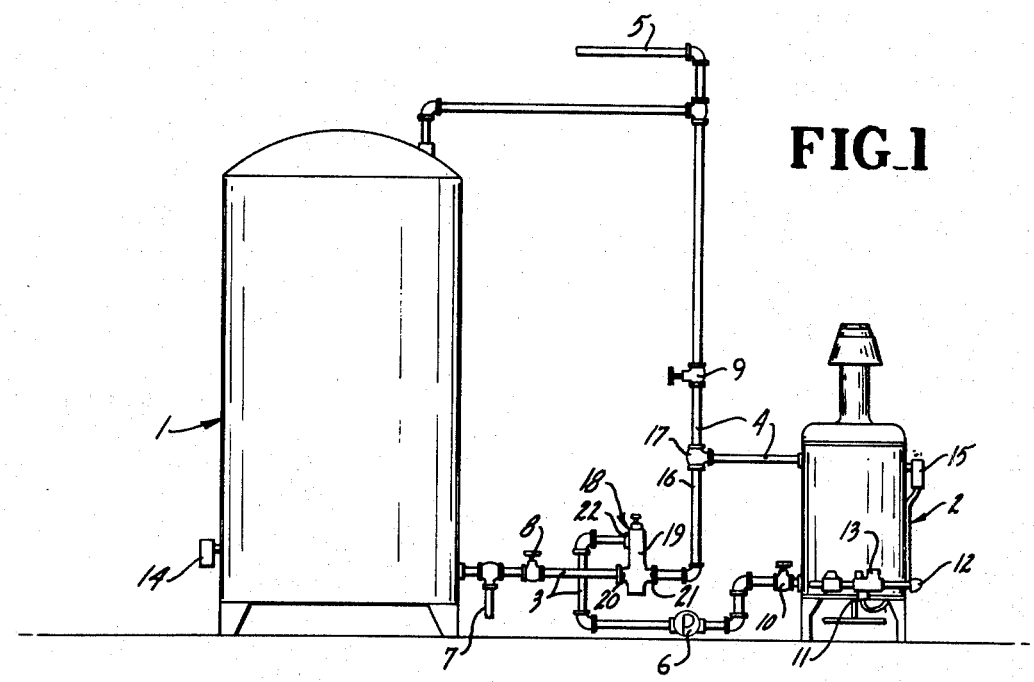
FIG. 1 is a schematic representation of the water heating system of the invention.

The water heater system with which the invention is illustrated has a hot water storage tank 1 which stores water at a predetermined temperature, such as 185°F., and is connected to a gas fired water heater 2 by the heater inlet conduit 3. The water which is heated by water heater 2 is circulated from the water heater 2 through the outlet conduit 4 to the upper portion of water storage tank 1 or to the discharge conduit 5 which may be connected to outlet conduit 4 for withdrawal of hot water. A separate discharge conduit, not shown, corresponding to conduit 5 may be connected to the water heater 2 rather than to the outlet conduit 4 to withdraw hot water from the system.

The water is circulated through the closed system described, by pump 6 which is shown as located in inlet conduit 3 adjacent the water heater 2. Fresh water is supplied to the inlet conduit 3 through supply conduit 7 when water is withdrawn from the system. Inlet conduit 3 may be closed by valve 8 and similarly, outlet conduit 4 may be closed by valve 9. An adjustable flow cock 10 may be provided in inlet conduit 3 to adjust the flow rate of the water through the water heater 2.

The hot water heater 2 may be of the conventional type having coils through which the water flows and which is heated by a gas burner 11. Gas is provided to the burner 11 through a gas line 12 and the flow of gas through the line is controlled by gas valve 13 which may have sensors to sense the temperature of the water flowing through heater 2 to actuate mechanism, not shown, to reduce gas flow or modulate the gas flow as the desired temperature in the system is approached. As illustrated in the drawings, however, operation of valve 13 is under the control of a temperature control 14 which is secured to the wall of tank 1 and senses the temperature of the water in tank 1, to open or close valve 13.

Limit control thermostat 15 is disposed in the coils of water heater 2 and responds to the water temperature therein to open electrical contacts when a predetermined temperature has been reached to deactivate the electrical circuit resulting in the closing of the valve 13 and stopping the flow of gas to burner 11.

Figure 3:
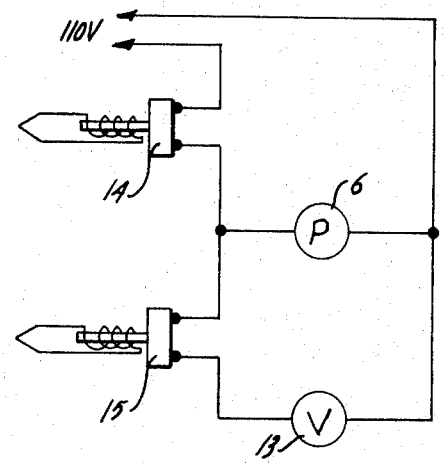
FIG. 3 is a wiring diagram of the system of FIG. 1.

The electrical circuit of the system is illustrated in FIG. 3. When the temperature of the water in tank 1 drops below a temperature such as 185° F., control 14 of tank 1 actuates the pump 6 to circulate water through the system and supplies power to the input terminals of the gas valve 13 to condition the circuit so that if limit control 15 on the heater is closed, valve 13 will open to deliver gas to burner 11. In the event that the temperature of water heater 2 exceeds a predetermined amount, such as 200° F., limit control 15 will open and this deactivates valve 13, but pump 6 will continue to circulate water in the system as long as control 14 is closed. However, when the temperature of the water in the tank 1 exceeds a temperature such as 185° F., then control 14 on tank 1 opens and the pump 6 stops if it is still in operation and, likewise, should the valve 13 be open, the power would be cut off and valve 13 would close. The controls 14 and 15 may be set for any desired temperature control other than those given in the example of the operation of the system.

In order to stabilize the operation of water heater 2 with respect to the temperature rise of the water heated therein and to provide usable hot water within a faster time limit, the system is provided with the recirculating conduit 16 for recirculating heated water from the heater back through inlet line 3. Conduit 16 is connected at one end to tee 17 which connects the outlet conduit 4 to the water heater 2 and to the tank 1. At the opposite end, conduit 16 is connected to the mixing valve 18 which is connected to inlet conduit 3.

Figure 2:
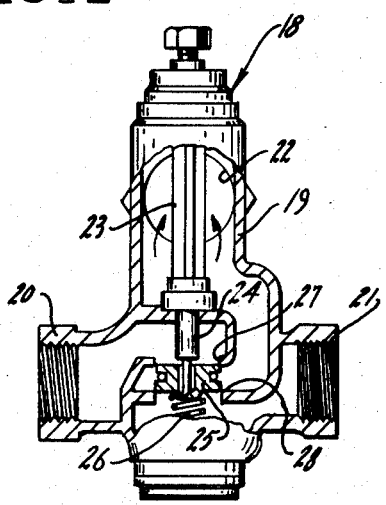
FIG. 2 is a cross sectional view of a mixing valve connected into the system which may be employed with the invention.

Mixing valve 18 is of a conventional type and, as shown in FIG. 2, has a body 19 having a cold water inlet port 20 connected to inlet conduit 3 for passage of water from the tank 1 or supply conduit 7. Opposite port 20 is a second inlet port 21 for passage of hot water from recirculating conduit 16. The discharge port 22 of valve 18 also connects with inlet conduit 3.

The flow through the mixing valve 18 is controlled by the setting of the thermostat 23 which, through stem 24, actuates valve member 25. The valve member 25 is normally biased by spring 26 against upper seat 27 so that only hot water would flow through the valve, but may be moved by the thermostat 23 to rest on lower seat 28, or may be regulated by thermostat 23 to varying positions between the seats 27 and 28 to effect mixing of the recirculated hot water with the incoming colder water of the inlet line 3 in accordance with the setting of thermostat 23.

Referring now to the operation of the recirculating branch of the system and mixing valve 18, when the system starts up by actuation of pump 6 and the opening of valve 13 by closing of the control 14 on tank 1 to supply power to the circuit, the valve member 25 is resting on upper seat 27 so that inlet port 20 for colder water is closed, and only hot water flows through the port 21 and through the valve to the branch of inlet conduit 3 leading to water heater 2. The water is thus circulated by pump 6 in the loop consisting of the branch of inlet conduit 3 leading from the mixing valve 18 to water heater 2, through water heater 2, thence through the branch of outlet conduit 4 leading from water heater 2 to tee 17 and thence through recirculating conduit 16 and mixing valve 18 and then back to the water heater 2 through inlet conduit 3.

The operation of the system can be illustrated by the following example:

| | |
|---|---|
| Desired outlet temperature of water drawn from storage tank | 185°F. |
| Inlet temperature of city water | 50°F. |
| Temperature rise of water flowing through water heater | 45°F. |
| Mixing valve setting | 140°F |
| Temperature use in system | 135°F. |

Under the design conditions set forth in the example, when the water is circulated through the heater it would normally be raised in temperature 45°F., thus circulation through the heater three times would give a total increase in the temperature of the water of 3 × 45°F., or 135°F., which would be added to the inlet temperature of the water of 50°F. to provide the outlet temperature of 185°F. However, due to heat losses in the conduits it has been found necessary to circulate the water 3 ½ to 5 times through the heater to obtain the 135°F. temperature rise in the system.

When the water flowing through the mixing valve 18 exceeds 140°F. as set forth in the above example, then the valve member 25 will be opened by thermostat 23 and colder water will flow into mixing valve 18 through port 20 and mix with the hot water recirculating from the heater for flow to the heater. When this occurs under the design conditions of the above example, two-thirds of the water flowing through water heater 2 initially recirculates through valve 18 and this would continue until the hot water reaches the bottom of tank 1. When this occurs mixing valve 18 adjusts the hot water inlet port 21 to reduce the circulated flow through conduit 16, and when the temperature of the water in the bottom of tank 1 increases above 140°F. port 21 is closed and no recirculated water would flow through valve 18, and thus only water flowing in conduit 3 from the storage tank 1 would pass to the heater. At any time, however, that water is withdrawn from the system, fresh water would be supplied through supply conduit 7.

Thus, under the water recirculating system of the invention, water heater 2 operates with only a small rise in temperature and yet water is supplied therefrom at a usable temperature without too much time passing before the desired temperature of the water in the storage tank 1 is obtained.

Although the invention has been illustrated in connection with a gas water heater and electric controls, it is contemplated that the water heater may be heated by other means such as electrically or by oil or indirectly, and the heater could be of the tank type. Furthermore, controls other than electrical may be employed in the system.

Various modes of carrying out the invention are contemplated as being within the scope of the following claims particularly pointing out and distinctly claiming the subject matter which is regarded as the invention.

I claim:

1. In a hot water heating system including a hot water storage tank and a water heater, a water heater circuit for circulation of water from the storage tank through an inlet conduit and the water heater and back to the storage tank through an outlet conduit from the water heater to maintain water in the storage tank at a predetermined temperature, a recirculating conduit connected in the circuit between the inlet and outlet conduits for recirculation of at least a portion of the water discharged from the water heater back through the water heater, a mixing valve disposed in the water heater circuit at the juncture of the inlet and recirculating conduits and being adapted under a predetermined temperature setting to mix the recirculating hot water with colder water flowing in the inlet conduit, pump means disposed in the water heater circuit for effecting upon actuation circulation of the water through the circuit, heating means to heat the water in the water heater, and control means disposed in the water heater circuit to regulate the heating means and the temperature of the water supplied to the storage tank by the water heater.

2. The hot water heating system of claim 1, and a fresh water supply conduit connected to the inlet conduit, and a discharge conduit connected in the water heater circuit for withdrawal of hot water.

3. The hot water heating system of claim 1, in which the pump means is located in the inlet conduit between the mixing valve and the water heater.

4. The hot water heating system of claim 1, and a thermostat in the mixing valve for opening and closing passages through the valve for flow of either hot or cold water or actuating the valve to a position where the colder inlet water mixes with the hot water recirculated through the heater.

\* \* \* \* \*